(12) United States Patent
Anderson

(10) Patent No.: US 9,304,376 B2
(45) Date of Patent: Apr. 5, 2016

(54) OPTICAL REDIRECTION ADAPTER

(71) Applicant: Hand Held Products, Inc., Fort Mill, SC (US)

(72) Inventor: Donald Anderson, Locke, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 135 days.

(21) Appl. No.: 13/771,508

(22) Filed: Feb. 20, 2013

(65) Prior Publication Data

US 2014/0232930 A1      Aug. 21, 2014

(51) Int. Cl.
  *G03B 17/56*      (2006.01)
(52) U.S. Cl.
  CPC ..................................... *G03B 17/565* (2013.01)
(58) Field of Classification Search
  CPC ... H04N 7/183; H04N 5/2254; H04N 5/2253; H04N 5/2256; H04N 5/2251; H04N 5/2252; H04N 5/23212
  USPC .............. 348/333.6, 335, 371, 370, 369, 143
  See application file for complete search history.

(56) References Cited

U.S. PATENT DOCUMENTS

| | | | |
|---|---|---|---|
| 7,224,894 B2* | 5/2007 | Kawakami | 396/175 |
| 2011/0007205 A1* | 1/2011 | Lee | 348/369 |
| 2013/0127309 A1 | 5/2013 | Wyner et al. | |
| 2013/0188943 A1 | 7/2013 | Wu | |
| 2014/0171150 A1* | 6/2014 | Hurst et al. | 455/556.1 |

OTHER PUBLICATIONS

Search Report issued May 28, 2014 in corresponding GB application No. GB1402852.6; 1 page.

* cited by examiner

*Primary Examiner* — Twyler Haskins
*Assistant Examiner* — Padma Haliyur
(74) *Attorney, Agent, or Firm* — Additon, Higgins & Pendleton, P.A.

(57) ABSTRACT

An optical redirection adapter for an electronic device having a camera includes a housing and an optical element. The optical element is attached to the housing and positioned such that, when the adapter is attached the electronic device, the optical element is positioned in the camera's field of view. The optical element reflects light in the camera's field of view from a redirection angle that is offset from the camera's field of view. The optical redirection adapter facilitates ergonomically sound use of the camera.

18 Claims, 4 Drawing Sheets

OPTICAL REDIRECTION ADAPTER

FIELD OF THE INVENTION

The present invention relates to the field of electronic device accessories, more specifically, to an optical redirection adapter for an electronic device.

BACKGROUND

A number of electronic devices that include built-in cameras are available to consumers. Typically, these cameras are placed on the side of the electronic device opposite the primary user-interface (e.g., a touch-screen and/or keypad). In other words, the cameras are typically placed on the back side of the electronic device.

For certain functions (e.g., taking a picture or imaging a symbol for decoding), pointing the end or edge of the electronic device at the intended target is more intuitive. When pointing the electronic device in this manner, however, the camera is facing downward rather than at the target. Thus, users that want to take a picture or image/read a symbol (e.g., a barcode) must hold the device and their head in a manner that is not ergonomically sound potentially resulting in repeatable, wrist, neck, and/or eye strains or injury.

Therefore, a need exists for an accessory for an electronic device having a camera that permits ergonomically sound use of the camera.

SUMMARY

Accordingly, in one aspect, the present invention embraces an optical redirection adapter for an electronic device having a camera that includes a housing for attaching to the electronic device and an optical element attached to the housing and positioned such that, when the adapter is attached to the electronic device, the optical element is positioned in the camera's field of view. When the adapter is attached to the electronic device, the optical element reflects light into the camera's field of view from a redirection angle that is offset from the camera's field of view.

In an exemplary embodiment, the electronic device has an illumination element and the optical element is positioned such that, when the adapter is attached to the electronic device, the optical element reflects light from the illumination element at the redirection angle.

In another exemplary embodiment, the redirection angle is approximately 90 degrees.

In yet another exemplary embodiment, when the adapter is attached to the electronic device, the optical element reflects light into the camera's field of view from a location along the electronic device's width that is different from the location of the camera's field of view along the electronic device's width.

In yet another exemplary embodiment, when the adapter is attached to the electronic device, the optical element reflects light into the camera's field of view from the center of the electronic device's width.

In yet another exemplary embodiment, the optical element is positioned in the housing such that, when the adapter is attached to the electronic device, the optical element is immediately adjacent the camera's external components.

In yet another exemplary embodiment, the housing includes a device opening for receiving the electronic device.

In yet another exemplary embodiment, the housing attaches to the electronic device via a friction fit between the housing and the electronic device.

In yet another exemplary embodiment, the housing attaches to the electronic device via a friction fit between the housing and the electronic device and the housing includes a notch for adjusting the strength of the friction fit between the housing and the electronic device.

In yet another exemplary embodiment, the housing attaches to the electronic device via a positive latch.

In yet another exemplary embodiment, the housing attaches to the electronic device via a positive latch having a quick release.

In yet another exemplary embodiment, the optical redirection adapter includes a collimating lens attached to the optical element.

In yet another exemplary embodiment, the optical redirection adapter includes a laser aimer attached to the housing.

In yet another exemplary embodiment, the optical redirection adapter includes an auxiliary attachment mechanism for maintaining free attachment of the adapter to the electronic device.

In yet another exemplary embodiment, the optical redirection adapter includes a lanyard for maintaining free attachment of the adapter to the electronic device.

In yet another exemplary embodiment, the optical redirection adapter includes a rubber surface on the exterior of the housing.

In yet another exemplary embodiment, the housing includes an access opening.

In yet another exemplary embodiment, the optical element includes a prism.

In yet another exemplary embodiment, the optical element includes a mirror.

In yet another exemplary embodiment, when the adapter is attached to the electronic device, the optical element reflects light into the camera's field of view such that a reflected image is not flipped or rotated.

In yet another exemplary embodiment, the housing includes an optical opening.

In another aspect, the present invention embraces an optical redirection adapter for an electronic device having a camera that includes a housing for attaching to the electronic device and an optical element attached to the housing and positioned such that, when the adapter is attached to the electronic device, the optical element is positioned in the camera's field of view. When the adapter is attached to the electronic device, the optical element reflects light into the camera's field of view from a redirection angle that is offset from the camera's field of view and from the center of the electronic device's width.

In an exemplary embodiment, the electronic device has an illumination element and the optical element is positioned such that, when the adapter is attached to the electronic device, the optical element reflects light from the illumination element at the redirection angle.

In another exemplary embodiment, the redirection angle is approximately 90 degrees.

In yet another exemplary embodiment, the optical element is positioned in the housing such that, when the adapter is attached to the electronic device, the optical element is immediately adjacent the camera's external components.

In yet another exemplary embodiment, the housing includes a device opening for receiving the electronic device.

In yet another exemplary embodiment, the housing attaches to the electronic device via a friction fit between the housing and the electronic device.

In yet another exemplary embodiment, the housing attaches to the electronic device via a friction fit between the housing and the electronic device and the housing includes a notch for adjusting the strength of the friction fit between the housing and the electronic device.

In yet another exemplary embodiment, the housing attaches to the electronic device via a positive latch.

In yet another exemplary embodiment, the housing attaches to the electronic device via a positive latch having a quick release.

In yet another exemplary embodiment, the optical redirection adapter includes a collimating lens attached to the optical element.

In yet another exemplary embodiment, the optical redirection adapter includes a laser aimer attached to the housing.

In yet another exemplary embodiment, the optical redirection adapter includes an auxiliary attachment mechanism for maintaining free attachment of the adapter to the electronic device.

In yet another exemplary embodiment, the optical redirection adapter includes a lanyard for maintaining free attachment of the adapter to the electronic device.

In yet another exemplary embodiment, the optical redirection adapter includes a rubber surface on the exterior of the housing.

In yet another exemplary embodiment, the housing includes an access opening.

In yet another exemplary embodiment, the optical element includes a prism.

In yet another exemplary embodiment, the optical element includes a mirror.

In yet another exemplary embodiment, when the adapter is attached to the electronic device, the optical element reflects light into the camera's field of view such that a reflected image is not flipped or rotated.

In yet another exemplary embodiment, the housing includes an optical opening.

In yet another aspect, the present invention embraces an optical redirection adapter for an electronic device having a camera that includes a housing for attaching to the electronic device and an optical element attached to the housing and positioned such that, when the adapter is attached to the electronic device, the optical element is positioned in the camera's field of view. When the adapter is attached to the electronic device, the optical element reflects light into the camera's field of view from a redirection angle that is offset from the camera's field of view and such that a reflected image is not flipped or rotated.

In an exemplary embodiment, the electronic device has an illumination element and the optical element is positioned such that, when the adapter is attached to the electronic device, the optical element reflects light from the illumination element at the redirection angle.

In another exemplary embodiment, the redirection angle is approximately 90 degrees.

In yet another exemplary embodiment, when the adapter is attached to the electronic device, the optical element reflects light into the camera's field of view from a location along the electronic device's width that is different from the location of the camera's field of view along the electronic device's width.

In yet another exemplary embodiment, when the adapter is attached to the electronic device, the optical element reflects light into the camera's field of view from the center of the electronic device's width.

In yet another exemplary embodiment, the optical element is positioned in the housing such that, when the adapter is attached to the electronic device, the optical element is immediately adjacent the camera's external components.

In yet another exemplary embodiment, the housing includes a device opening for receiving the electronic device.

In yet another exemplary embodiment, the housing attaches to the electronic device via a friction fit between the housing and the electronic device.

In yet another exemplary embodiment, the housing attaches to the electronic device via a friction fit between the housing and the electronic device and the housing includes a notch for adjusting the strength of the friction fit between the housing and the electronic device.

In yet another exemplary embodiment, the housing attaches to the electronic device via a positive latch.

In yet another exemplary embodiment, the housing attaches to the electronic device via a positive latch having a quick release.

In yet another exemplary embodiment, the optical redirection adapter includes a collimating lens attached to the optical element.

In yet another exemplary embodiment, the optical redirection adapter includes a laser aimer attached to the housing.

In yet another exemplary embodiment, the optical redirection adapter includes an auxiliary attachment mechanism for maintaining free attachment of the adapter to the electronic device.

In yet another exemplary embodiment, the optical redirection adapter includes a lanyard for maintaining free attachment of the adapter to the electronic device.

In yet another exemplary embodiment, the optical redirection adapter includes a rubber surface on the exterior of the housing.

In yet another exemplary embodiment, the housing includes an access opening.

In yet another exemplary embodiment, the optical element includes a prism.

In yet another exemplary embodiment, the optical element includes a mirror.

In yet another exemplary embodiment, the housing includes an optical opening.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces an accessory for an electronic device having a camera that permits ergonomically sound use of the camera. More specifically, the present invention embraces an optical redirection adapter for an electronic device that allows a user to point the end or edge of the electronic device at an intended camera or imaging target.

The optical redirection adapter of the present invention typically includes a housing for attaching to an electronic device and an optical element attached to the housing. The optical element is positioned (i.e., with respect to the electronic device and/or the housing) such that, when the adapter is attached to an electronic device having a camera, the optical element is positioned in the camera's field of view. The optical element reflects light into the camera's field of view from a redirection angle that is offset from the camera's field of view. In other words, the optical element redirects the camera's effective field of view from its standard or typical field of view (i.e., the camera's field of view without an optical adapter).

The term electronic device is used herein in a broad sense and includes cellular phones, smartphones, tablet devices, and portable audio devices. Exemplary electronic devices include devices that run Apple, Inc.'s iOS operating system, such as any of the iPhone, iPad, or iPod models. That said, electronic devices running on an Android, Microsoft, or any other operating system are also within the scope of the present invention.

Figure 1:
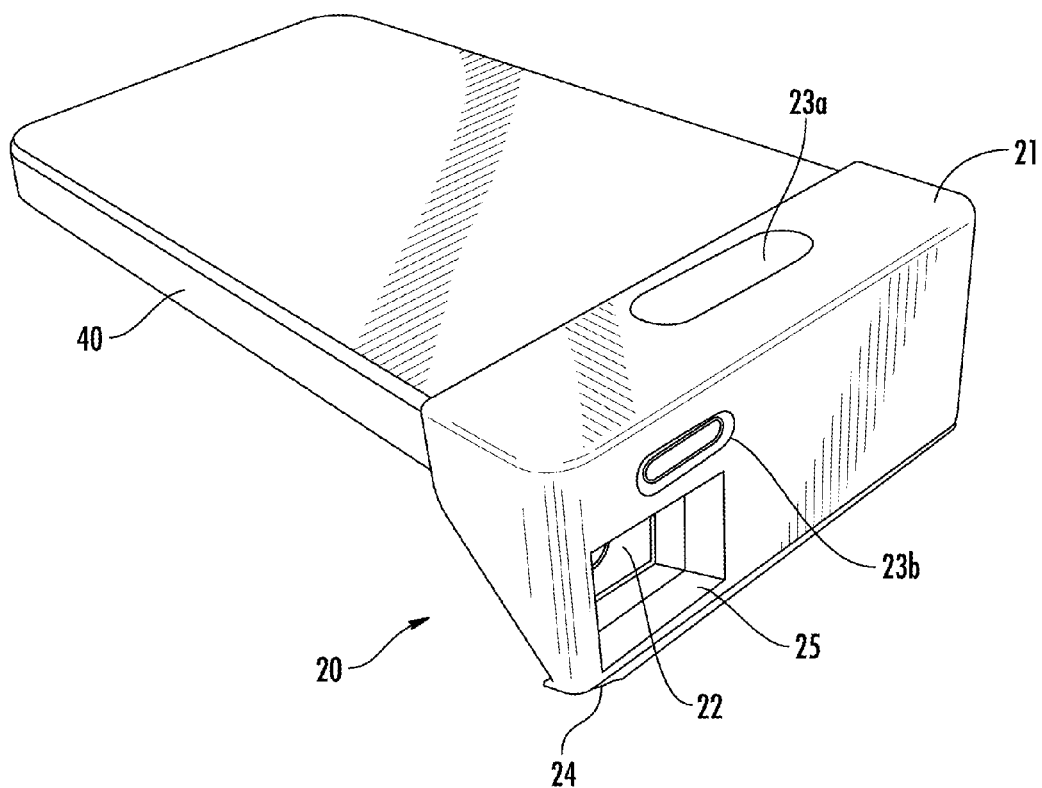
FIG. 1 depicts a perspective view of an exemplary optical redirection adapter attached to an electronic device.

FIG. 1 depicts a perspective view of an exemplary optical redirection adapter 20 attached to an electronic device 40. The optical redirection adapter 20 includes a housing 21 and an optical element 22. In the depicted embodiment, the optical element 22 is a prism, but the optical element 22 may include a mirror or lens (e.g., a collimating lens). Additionally, the optical element 22 may include a combination of prisms, mirrors, and/or lenses. The housing 21 includes an optical opening 25 to permit light to enter and exit the optical element 22. In some embodiments, the optical redirection adapter 20 may include a collimating lens attached to the optical element 22.

In exemplary embodiments, the optical redirection adapter 20 may include a symbol on the housing 21. The symbol may be a logo, trademark, or decoration. The housing 21 may include a pocket or recess to receive such a symbol.

Figure 3:
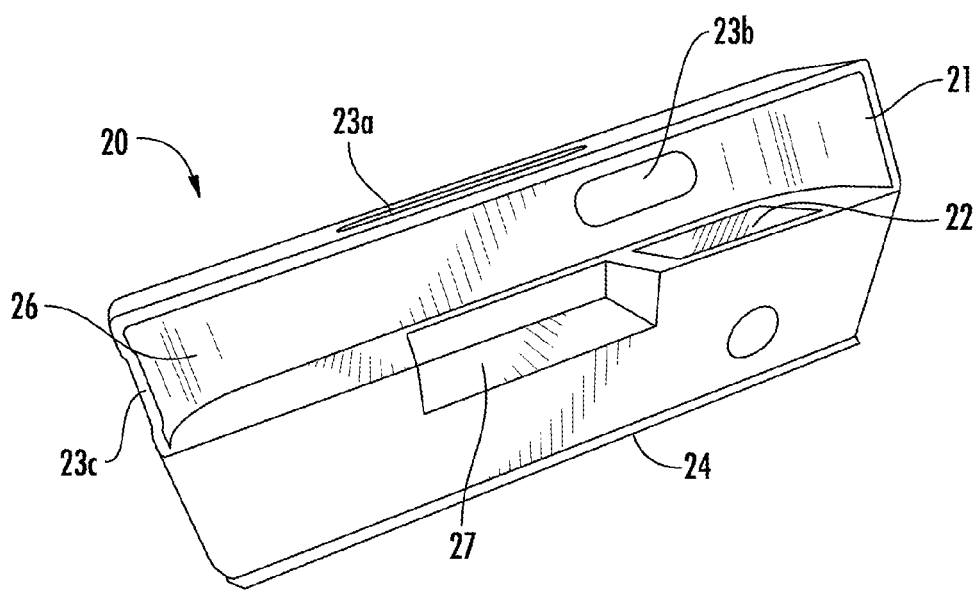
FIG. 3 depicts a rear view of the exemplary optical redirection adapter of FIG. 1 without the electronic device.

The housing 21 includes a number of access openings 23a, 23b, and 23c (See FIG. 3). The housing 21 typically includes access openings to maintain or enhance the functionality of features on the exterior of the electronic device 40. For example, access opening 23a maintains the functionality of a speaker and microphone on the electronic device 40, and access opening 23b provides access to an external button on the electronic device 40.

The exemplary optical redirection adapter 20 also includes a rubber surface 24 on the exterior of the housing 21. As depicted, the rubber surface 24 is located on the lower portion of the housing 21 to prevent sliding of the electronic device 40 and optical redirection adapter 20 when they are placed on a surface. Rather than a rubber surface 24, the optical redirection adapter 20 may include an anti-skid or increased friction surface of other types of materials or textures capable of providing anti-skid or increased friction characteristics. Furthermore, the optical redirection adapter 20 may include such a surface in other locations on the housing 21 or in multiple places on the housing 21.

Figure 2:
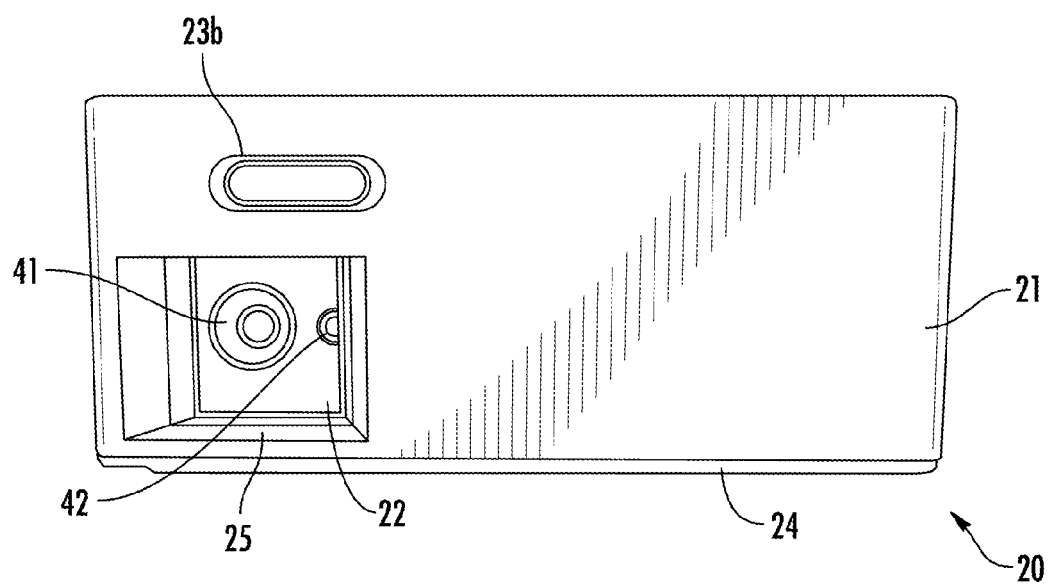
FIG. 2 depicts a front view of the exemplary optical redirection adapter of FIG. 1.

FIG. 2 depicts a front view of the exemplary optical redirection adapter 20 of FIG. 1. In this front view, the camera 41 and illumination element 42 of the electronic device 40 are visible through the optical element 22. The camera 41 and illumination element 42 face downward from the bottom surface of the electronic device 40, but the optical element 22 reflects light at a redirection angle such that camera 41 and illumination element 42 appear to face outward from the front edge of the electronic device 40 and optical redirection adapter 20.

In the depicted embodiment, the redirection angle is approximately 90 degrees. In other words, rather than receiving light from a field of view extending downward from the electronic device 40 (i.e., the camera's standard or typical field of view), the camera 41 receives light from an effective field of view that extends horizontally or parallel to the length of the surface of the electronic device 40 upon which the camera 41 is located. Similarly, rather than shining downward from the electronic device 40, light from the illumination element 42 is reflected by the optical element 22 to emit horizontally or parallel to the length of the surface of the electronic device 40 upon which the illumination element 42 is located. The redirection angle is the angle between the central axis of the camera's standard or typical field of view (i.e., without the adapter) and the central axis of the camera's effective field of view (i.e., with the adapter) as measured perpendicular to the electronic device's width.

Furthermore, the optical element 22 may reflect light at a redirection angle of between about 45 degrees and 115 degrees (e.g., between about 60 degrees and 85 degrees). The redirection angle achieved by the optical element 22 facilitates an ergonomically sound use of the camera 41 and illumination element 42. For example, rather than aiming the bottom surface of the electronic device 40 at an imaging target, a user may point the end or edge of the electronic device 40 equipped with the optical redirection adapter 20 in a more intuitive manner.

In exemplary embodiments, the optical element 22 reflects light into the camera's field of view such that the reflected image is not flipped or rotated. That said, the optical element 22 may reflect light into the camera's field of view such that the reflected image is flipped and/or rotated.

FIG. 3 depicts a rear view of the exemplary optical redirection adapter 20 of FIG. 1 without the electronic device 40. The housing 21 includes a device opening 26 for receiving the electronic device and a notch 27. In this embodiment, the housing 21 attaches to the electronic device via a friction fit that is achieved by the device opening 26 and may be adjusted by the notch 27. The device opening 26 is typically shaped to correspond to the outer shape and contours of the electronic device while providing enough friction to keep the optical redirection adapter 20 attached to the electronic device. An insert, such as a foam or rubber pad, may be placed in the notch 27 to engage both the housing 21 and the electronic device thereby increasing the strength of the friction fit. In alternative embodiments, the optical redirection adapter 20 may include a positive latch (e.g., having a quick release) for attaching the housing 21 to the electronic device.

As depicted, a portion of the optical element 22 is visible within the device opening 26. The visible portion of the optical element 22 is positioned in the housing 21 such that, when the optical redirection adapter 20 is attached to the electronic device, the optical element 22 is immediately adjacent the camera's external components.

Figure 4:
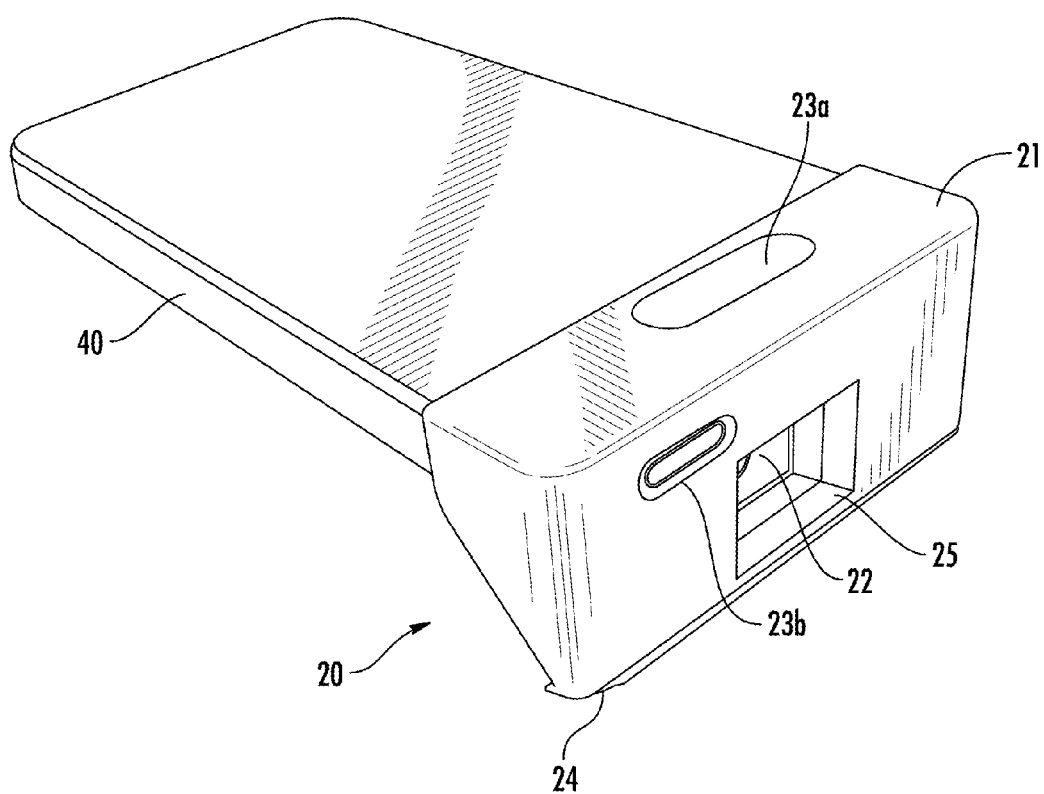
FIG. 4 depicts a perspective view of another exemplary optical redirection adapter attached to an electronic device.

FIG. 4 depicts a perspective view of another exemplary optical redirection adapter 20 attached to an electronic device 40. The optical redirection adapter 20 includes a housing 21 and an optical element 22. The housing 21 includes an optical opening 25 located at a different location along the electronic device's width as compared to FIG. 1. In particular, the optical opening 25 is located at the center of the electronic device's width.

Figure 5:
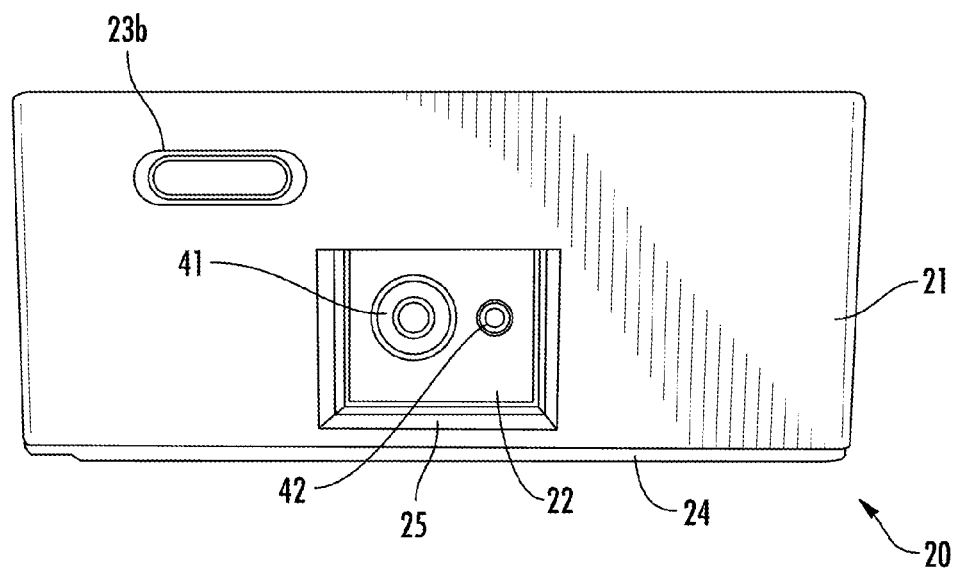
FIG. 5 depicts a front view of the exemplary optical redirection adapter of FIG. 4.

FIG. 5 depicts a front view of the exemplary optical redirection adapter 20 of FIG. 4. In this front view, the camera 41 and illumination element 42 of the electronic device 40 are visible through the optical element 22.

The electronic device 40 of FIGS. 4-5 is the same electronic device 40 of FIGS. 1-2. Furthermore, the camera 41 and illumination element 42 face downward from the left portion (as viewed in FIGS. 2 and 5) of the electronic device's bottom surface. Thus, the exemplary optical redirection adapter 20 of FIGS. 1-3 includes an optical element 22 that reflects light into the camera's field of view from the same location along the electronic device's width as the location of the camera's field of view along the electronic device's width.

Figure 6:
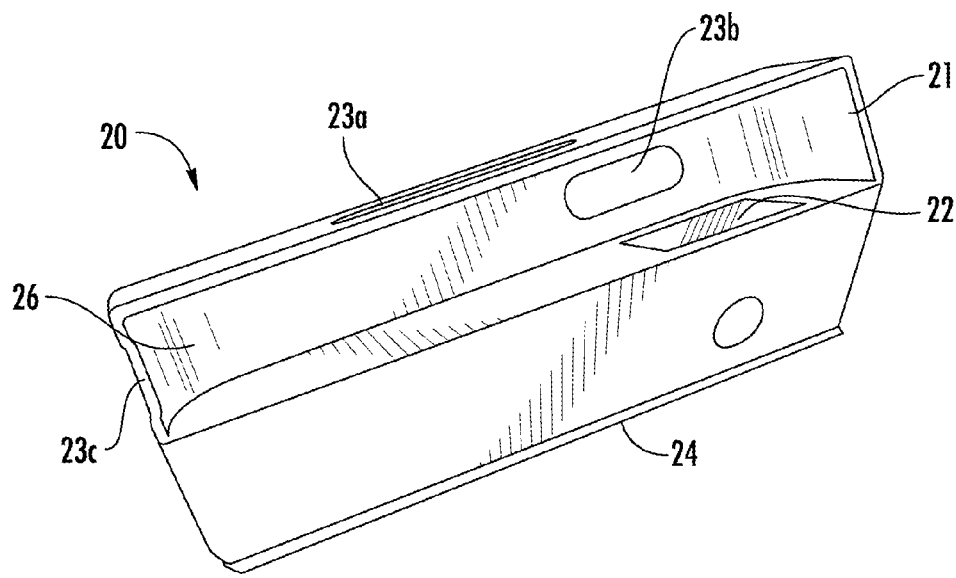
FIG. 6 depicts a rear view of the exemplary optical redirection adapter of FIG. 4 without the electronic device.

The exemplary optical redirection adapter 20 of FIGS. 4-6, however, includes an optical element 22 that reflects light into the camera's field of view from a location along the electronic device's width that is different from the location of the camera's field of view along the electronic device's width. In particular, the optical element 22 reflects light into the camera's field of view from the center of the electronic device's width.

FIG. 6 depicts a rear view of the exemplary optical redirection adapter 20 of FIG. 4 without the electronic device 40. The housing 21 includes a device opening 26 for receiving the electronic device. As depicted, a portion of the optical element 22 is visible within the device opening 26. The visible portion of the optical element 22 is positioned in the housing 21 such that, when the optical redirection adapter 20 is attached to the electronic device, the optical element 22 is immediately adjacent the camera's external components.

The locations of the portions of the optical element 22 visible in FIGS. 5 and 6 demonstrate that the optical element 22 reflects light within the housing 21 along the electronic device's width. In the exemplary optical redirection adapter 20 of FIGS. 4-6, the optical element 22 reflects light from the left portion (as viewed in FIG. 5) of the electronic device's width to the center of the electronic device's width. Other exemplary optical redirection adapters may include optical elements that reflect light from the right portion (as viewed in FIG. 5) of the electronic device's width to the center of the electronic device's width.

Optical elements that reflect light along the electronic device's width facilitate an ergonomically sound use of the camera and illumination element. For example, rather than aiming the left or right portion of the electronic device at an imaging target, a user may point the width-wise center of the electronic device equipped with an optical redirection adapter including such an optical element in a more intuitive manner.

Exemplary embodiments of the optical redirection adapter may include a laser aimer attached to the housing. The laser aimer is typically positioned such that the laser beam or laser pattern emitted by the laser aimer corresponds to the effective field of view of the electronic device's camera as modified by the optical element.

Exemplary embodiments of the optical redirection adapter may also include an auxiliary attachment mechanism (e.g., a lanyard) to maintain a fee attachment of the adapter to the electronic device when the adapter is not in use.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical redirection adapter for an electronic device having a camera, comprising:
 a housing having an opening shaped to correspond to an outer shape of the electronic device for attaching to the electronic device; and
 an optical element attached to the housing and positioned such that, when the adapter is attached to the electronic device, the optical element is positioned in the camera's field of view;
 wherein, when the adapter is attached to the electronic device, the optical element reflects light into the camera's field of view from a redirection angle that is offset from the camera's field of view; and
 wherein, the housing attaches to the electronic device via a friction fit between the opening of the housing and the outer shape of the electronic device.

2. The optical redirection adapter according to claim 1, wherein:
 the electronic device has an illumination element; and
 the optical element is positioned such that, when the adapter is attached to the electronic device, the optical element reflects light from the illumination element at the redirection angle.

3. The optical redirection adapter according to claim 1, wherein the redirection angle is approximately 90 degrees.

4. The optical redirection adapter according to claim 1, wherein, when the adapter is attached to the electronic device, the optical element reflects light into the camera's field of view from a location along the electronic device's width that is different from the location of the camera's field of view along the electronic device's width.

5. The optical redirection adapter according to claim 1, wherein the optical element is positioned in the housing such that, when the adapter is attached to the electronic device, the optical element is immediately adjacent the camera's external components.

6. The optical redirection adapter according to claim 1, wherein the housing attaches to the electronic device via a friction fit between the housing and the electronic device; and
 wherein the housing comprises a notch for adjusting the strength of the friction fit between the housing and the electronic device.

7. An optical redirection adapter for an electronic device with a front including a height from a top to a bottom and a width from one side to another side, and having a camera, comprising:
 a housing having an opening shaped to correspond to an outer shape of the electronic device for attaching to the electronic device; and
 an optical element attached to the housing and positioned such that, when the adapter is attached to the electronic device, the optical element is positioned in the camera's field of view;
 wherein, when the adapter is attached to the electronic device, the optical element reflects light into the camera's field of view from a redirection angle that is offset from the camera's field of view; and
 wherein, when the adapter is attached to the electronic device, the optical element reflects light into the camera's field of view from the center of the electronic device's width.

8. The optical redirection adapter according to claim 7, wherein:
 the electronic device has an illumination element; and
 the optical element is positioned such that, when the adapter is attached to the electronic device, the optical element reflects light from the illumination element at the redirection angle.

9. The optical redirection adapter according to claim 7, wherein the redirection angle is approximately 90 degrees.

10. The optical redirection adapter according to claim 7, wherein the housing attaches to the electronic device via a friction fit between the housing and the electronic device; and
wherein the housing comprises a notch for adjusting the strength of the friction fit between the housing and the electronic device.

11. The optical redirection adapter according to claim 7, wherein the housing attaches to the electronic device via a positive latch.

12. The optical redirection adapter according to claim 7, comprising a rubber surface on the exterior of the housing.

13. The optical redirection adapter according to claim 7, wherein, when the adapter is attached to the electronic device, the optical element reflects light into the camera's field of view such that a reflected image is not flipped or rotated.

14. An optical redirection adapter for an electronic device with a front including a height from a top to a bottom and a width from one side to another side, and having a camera, comprising:
    a housing having an opening shaped to correspond to an outer shape of the electronic device for attaching to the electronic device; and
    an optical element attached to the housing and positioned such that, when the adapter is attached to the electronic device, the optical element is positioned in the camera's field of view;
    wherein, when the adapter is attached to the electronic device, the optical element reflects light into the camera's field of view from a redirection angle that is offset from the camera's field of view; and
    wherein, when the adapter is attached to the electronic device, the optical element reflects light into the camera's field of view from a location along the electronic device's width that is different from the location of the camera's field of view along the electronic device's width.

15. The optical redirection adapter according to claim 14, wherein:
    the electronic device has an illumination element; and
    the optical element is positioned such that, when the adapter is attached to the electronic device, the optical element reflects light from the illumination element at the redirection angle.

16. The optical redirection adapter according to claim 14, wherein the optical element is positioned in the housing such that, when the adapter is attached to the electronic device, the optical element is immediately adjacent the camera's external components.

17. The optical redirection adapter according to claim 14, wherein the optical element comprises a prism.

18. The optical redirection adapter according to claim 14, wherein the optical element comprises a mirror.

* * * * *